(12) United States Patent
Gao et al.

(10) Patent No.: US 12,650,310 B2
(45) Date of Patent: Jun. 9, 2026

(54) GLOBAL POSITION AND ORIENTATION CORRECTION METHOD

(71) Applicant: BEIJING BAIDU NETCOM SCIENCE TECHNOLOGY CO., LTD., Beijing (CN)

(72) Inventors: Wei Gao, Beijing (CN); Wendong Ding, Beijing (CN); Guowei Wan, Beijing (CN); Liang Peng, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 162 days.

(21) Appl. No.: 18/216,556

(22) Filed: Jun. 29, 2023

(65) Prior Publication Data

US 2023/0341228 A1      Oct. 26, 2023

(30) Foreign Application Priority Data

Jun. 30, 2022     (CN) .......................... 202210771681.6

(51) Int. Cl.
*G01C 21/28*          (2006.01)
*G01C 21/00*          (2006.01)

(52) U.S. Cl.
CPC ......... *G01C 21/28* (2013.01); *G01C 21/3848* (2020.08)

(58) Field of Classification Search
CPC .... G01C 21/28; G01C 21/3848; G01C 25/00; G01C 21/343; G01C 22/00; G01S 13/865;

(Continued)

(56) References Cited

U.S. PATENT DOCUMENTS

2019/0226852 A1* 7/2019 Xie ........................ G01C 21/20
2022/0081003 A1* 3/2022 Brown ................ B60W 30/143

(Continued)

FOREIGN PATENT DOCUMENTS

CN        111784835 A      10/2020
CN        111862163 A      10/2020

(Continued)

OTHER PUBLICATIONS

Mohamed M. Atia , Steven L. Waslander Map-aided adaptive GNSS/IMU sensor fusion scheme for robust urban navigation, Sep. 1, 2018, measurement 131 (2019) 615-627.*

*Primary Examiner* — Hitesh Patel
*Assistant Examiner* — Reece Anthony Wakely
(74) *Attorney, Agent, or Firm* — MASCHOFF BRENNAN; Liang Huang

(57)          ABSTRACT

A method is provided. The method includes: obtaining global position and orientation information of a first trajectory point; determining at least one pair of second trajectory points based on the global position and orientation information; obtaining a relative position and orientation estimation information and a relative position and orientation measurement information of each pair of second trajectory points; and calculating a local rotation offset at the first trajectory point based on the relative position and orientation estimation information and the relative position and orientation measurement information of each pair of second trajectory points in the at least one pair of second trajectory points to correct the global position and orientation information.

17 Claims, 4 Drawing Sheets

(58) Field of Classification Search
  CPC .......... G01S 19/37; G01S 19/40; G01S 19/46;
  G01S 19/47
  See application file for complete search history.

(56)                References Cited

U.S. PATENT DOCUMENTS

| | | | |
|---|---|---|---|
| 2022/0227380 A1* | 7/2022 | Griffith .................... | G06T 7/246 |
| 2023/0194306 A1* | 6/2023 | Liu ..................... | G01C 21/3837 |
| | | | 701/412 |
| 2024/0151535 A1* | 5/2024 | Foloppe ............... | G01C 21/165 |

FOREIGN PATENT DOCUMENTS

| | | | |
|---|---|---|---|
| CN | 112669358 A | | 4/2021 |
| CN | 113989451 A | | 1/2022 |
| KR | 10-2019-0064311 A | | 6/2019 |
| TW | 202314604 A | * | 4/2023 |
| WO | 2014/076844 A1 | | 5/2014 |
| WO | 2021/218620 A1 | | 11/2021 |

* cited by examiner

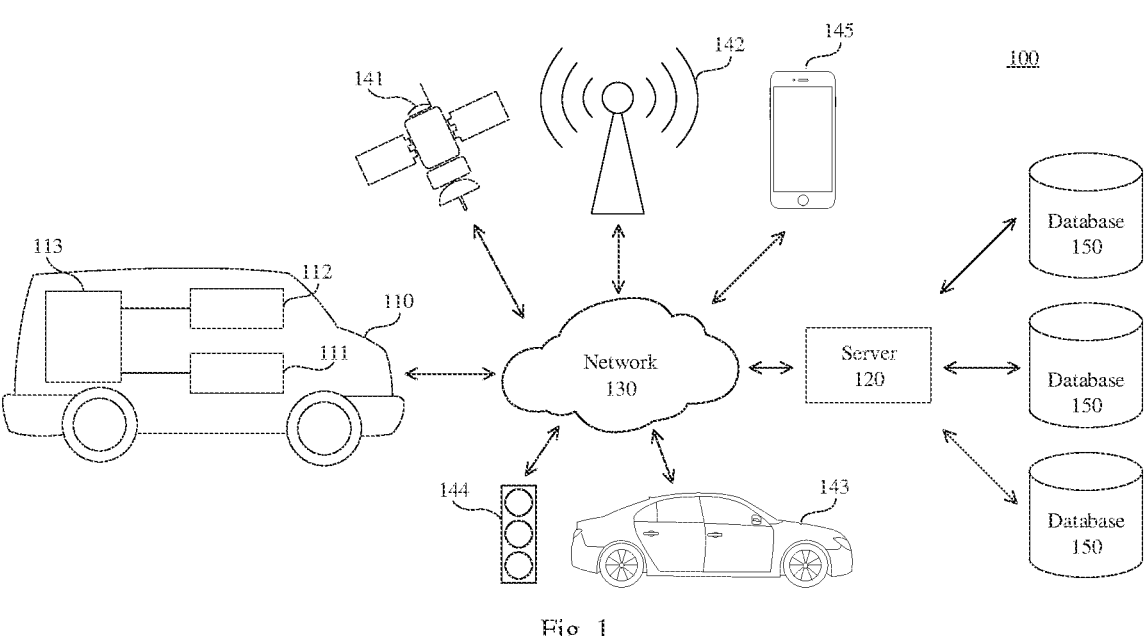

Fig. 1

| |
|---|
| Obtain global position and orientation information of a first trajectory point | ～S201 |

↓

| Determine at least one pair of second trajectory points based on the global position and orientation information, wherein the at least one pair of second trajectory points and the first trajectory point are located on the same trajectory | ～S202 |

↓

| Obtain relative position and orientation estimation information and relative position and orientation measurement information of each pair of second trajectory points in the at least one pair of second trajectory points | ～S203 |

↓

| Calculate a local rotation offset at the first trajectory point based on the relative position and orientation estimation information and the relative position and orientation measurement information of each pair of second trajectory points to correct the global position and orientation information | ～S204 |

Fig. 2

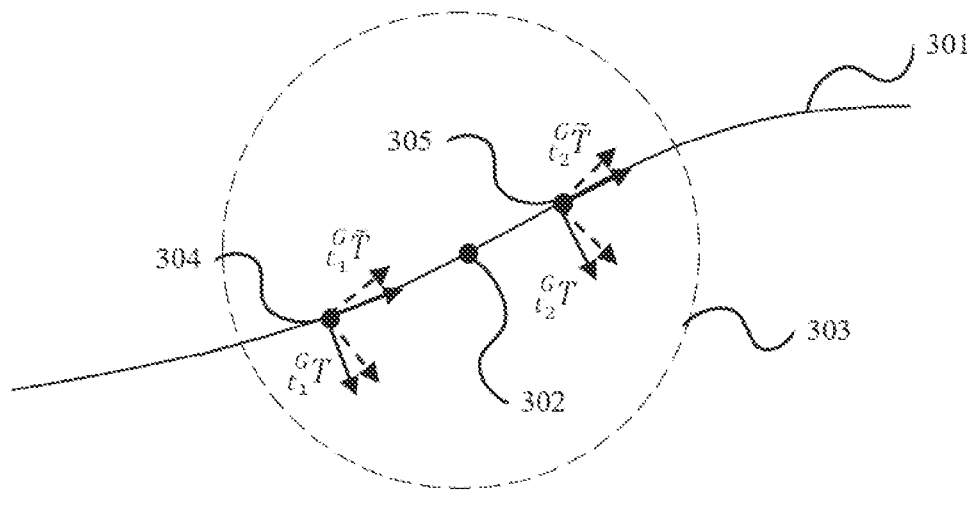

Fig. 3

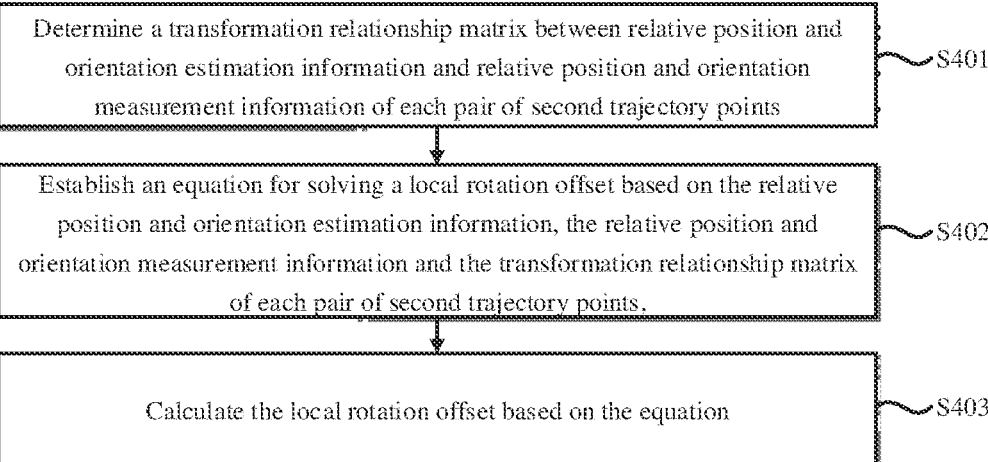

| Determine a transformation relationship matrix between relative position and orientation estimation information and relative position and orientation measurement information of each pair of second trajectory points | S401 |

| Establish an equation for solving a local rotation offset based on the relative position and orientation estimation information, the relative position and orientation measurement information and the transformation relationship matrix of each pair of second trajectory points. | S402 |

| Calculate the local rotation offset based on the equation | S403 |

Fig. 4

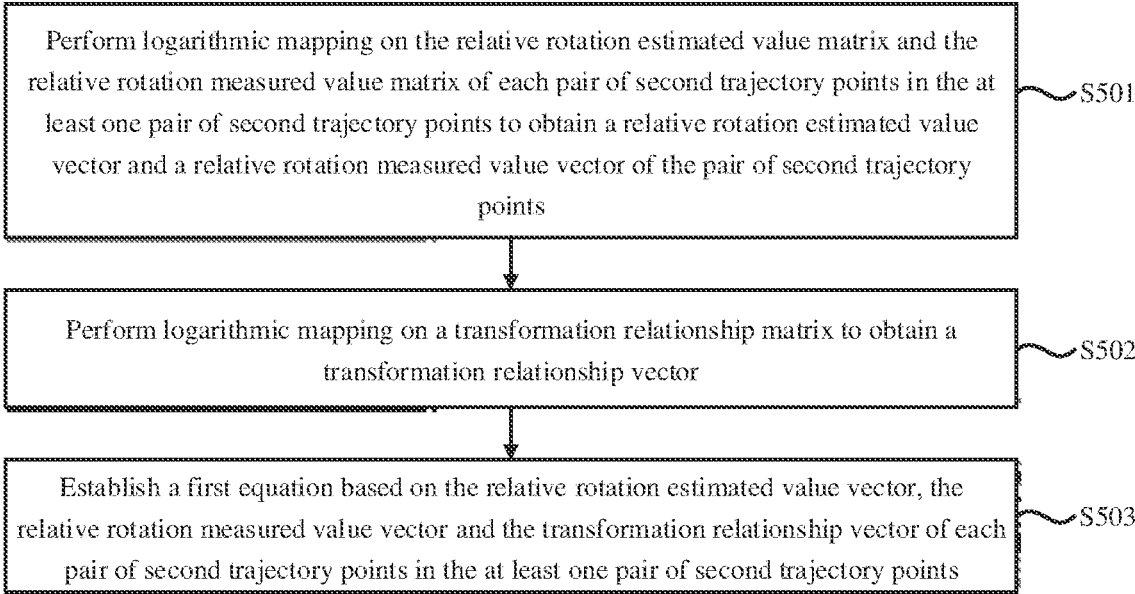

Perform logarithmic mapping on the relative rotation estimated value matrix and the relative rotation measured value matrix of each pair of second trajectory points in the at least one pair of second trajectory points to obtain a relative rotation estimated value vector and a relative rotation measured value vector of the pair of second trajectory points ~S501

Perform logarithmic mapping on a transformation relationship matrix to obtain a transformation relationship vector ~S502

Establish a first equation based on the relative rotation estimated value vector, the relative rotation measured value vector and the transformation relationship vector of each pair of second trajectory points in the at least one pair of second trajectory points ~S503

Fig. 5

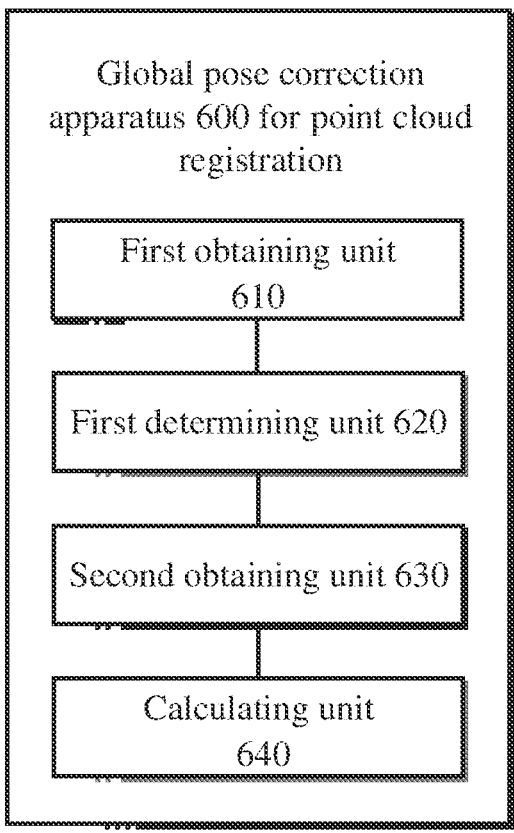

Global pose correction apparatus 600 for point cloud registration

First obtaining unit 610

First determining unit 620

Second obtaining unit 630

Calculating unit 640

Fig. 6

GLOBAL POSITION AND ORIENTATION CORRECTION METHOD

CROSS REFERENCE TO RELATED APPLICATION

This application claims priority to Chinese patent application No. 202210771681.6, filed on Jun. 30, 2022, the content of which is hereby incorporated by reference in its entirety for all purposes.

TECHNICAL FIELD

The present disclosure relates to the technical field of computers, especially, the technical fields of automatic driving, high definition maps and navigation, in particular to a global position and orientation correction method and apparatus for point cloud registration, an electronic device, a computer-readable storage medium and a computer program product.

BACKGROUND

A high definition map is also called a high accuracy map, which is used by a self-driving automobile. The high definition map has accurate vehicle location information and rich road element data information and can help the automobile to know complex road surface information in advance, for example, a slope, a curvature, a driving direction, and the like, so as to better avoid potential risks.

In making of the high definition map, point cloud data collection is usually performed on a certain section of a road firstly, meanwhile, data collection is performed through a global navigation satellites system (GNSS) and an inertial measurement unit (IMU), global position and orientation information estimation is performed based on the above data, then a global position and orientation of a point cloud data collection device is obtained based on an estimation result, and registration is performed on point cloud data based on that.

A method described in this part is not necessarily a method envisaged or adopted before. Unless otherwise indicated, it should not be presumed that any of methods described in this part is regarded as the prior art only depending on being included in this part. Likewise, unless otherwise indicated, the problem mentioned in this part should not be constructed as being recognized in any prior art.

SUMMARY

The present disclosure provides a global position and orientation correction method and apparatus for point cloud registration, an electronic device, a computer-readable storage medium and a computer program product.

According to an aspect of the present disclosure, a computer-implemented method is provided and includes: obtaining global position and orientation information of a first trajectory point; determining at least one pair of second trajectory points based on the global position and orientation information, wherein the at least one pair of second trajectory points and the first trajectory point are located on the same trajectory; obtaining a relative position and orientation estimation information and a relative position and orientation measurement information of each pair of second trajectory points in the at least one pair of second trajectory points, wherein the relative position and orientation estimation information is obtained based on a global position and orientation information of each second trajectory point in the pair of second trajectory points, and the relative position and orientation measurement information is obtained through a mileage measurement device; and calculating a local rotation offset at the first trajectory point based on the relative position and orientation estimation information and the relative position and orientation measurement information of each pair of second trajectory points in the at least one pair of second trajectory points to correct the global position and orientation information.

According to another aspect of the present disclosure, an electronic device is provided and includes: one or more processors; and a memory storing one or more programs configured to be executed by the one or more processors, the one or more programs comprising instructions for: obtaining global position and orientation information of a first trajectory point; determining at least one pair of second trajectory points based on the global position and orientation information, wherein the at least one pair of second trajectory points and the first trajectory point are located on the same trajectory; obtaining a relative position and orientation estimation information and a relative position and orientation measurement information of each pair of second trajectory points in the at least one pair of second trajectory points, wherein the relative position and orientation estimation information is obtained based on global position and orientation information of each second trajectory point in the pair of second trajectory points, and the relative position and orientation measurement information is obtained through a mileage measurement device; and calculating a local rotation offset at the first trajectory point based on the relative position and orientation estimation information and the relative position and orientation measurement information of each pair of second trajectory points in the at least one pair of second trajectory points to correct the global position and orientation information.

According to another aspect of the present disclosure, a non-transitory computer-readable storage medium is provided, and the non-transitory computer-readable storage medium, stores one or more programs comprising instructions that, when executed by one or more processors of a computing device, cause the computing device to perform operations comprising: obtaining global position and orientation information of a first trajectory point; determining at least one pair of second trajectory points based on the global position and orientation information, wherein the at least one pair of second trajectory points and the first trajectory point are located on the same trajectory; obtaining a relative position and orientation estimation information and a relative position and orientation measurement information of each pair of second trajectory points in the at least one pair of second trajectory points, wherein the relative position and orientation estimation information is obtained based on a global position and orientation information of each second trajectory point in the pair of second trajectory points, and the relative position and orientation measurement information is obtained through a mileage measurement device; and calculating a local rotation offset at the first trajectory point based on the relative position and orientation estimation information and the relative position and orientation measurement information of each pair of second trajectory points in the at least one pair of second trajectory points to correct the global position and orientation information.

It should be understood that described contents in this part are neither intended to indicate key or important features of the embodiments of the present disclosure, nor used to limit the scope of the present disclosure. Other features of the present disclosure will become easier to understand through the following specification.

BRIEF DESCRIPTION OF THE DRAWINGS

Accompanying drawings, which constitute a part of the specification, exemplarily illustrate embodiments and, together with text description of the specification, serve to explain implementations of the embodiments. The illustrated embodiments are only intended to serve as examples without limiting the scope of claims. In all the drawings, the same reference numbers represent similar but not necessarily the same elements.

FIG. 1 shows a schematic diagram of a system where various methods described herein may be implemented according to some embodiments of the present disclosure.

FIG. 2 shows a flowchart of a global position and orientation correction method for point cloud registration according to some embodiments of the present disclosure.

FIG. 3 shows a schematic diagram of a trajectory of a data collection device according to some embodiments of the present disclosure.

FIG. 4 shows a flowchart of calculating a local rotation offset at a first trajectory point according to some embodiments of the present disclosure.

FIG. 5 shows a flowchart of capability of implementing building an equation based on a relative rotation estimated value matrix, a relative rotation measured value matrix and a transformation relationship matrix according to some embodiments of the present disclosure.

FIG. 6 shows a structural block diagram of a global position and orientation correction apparatus for point cloud registration according to some embodiments of the present disclosure.

DETAILED DESCRIPTION

Figure 7:
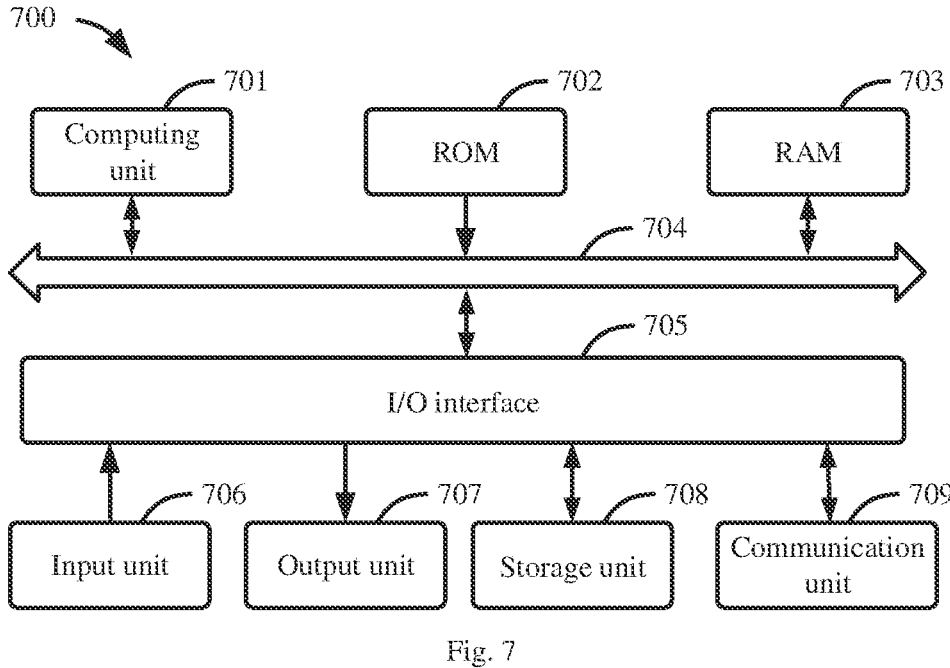
FIG. 7 shows a structural block diagram of an electronic device capable of being used for implementing some embodiments of the present disclosure.

Embodiments of the present disclosure are described below with reference to the drawings, which include various details of the embodiments of the present disclosure for better understanding and should be regarded as only exemplary. Therefore, those ordinarily skilled in the art should realize that various changes and modifications can be made to embodiments described herein without departing from the scope of the present disclosure. Similarly, for the sake of clarity and conciseness, description of known functions and structures is omitted in the following description.

In the present disclosure, unless otherwise stated, terms such as "first" and "second" used for describing various elements are not intended to limit a position relation, a timing sequence relation or a significance relation of these elements and are only used for distinguishing one element from another element. In some examples, a first element and a second element may refer to the same instance of the elements, which, in some cases, may also refer to different instances on the basis of description of the context.

Terms used in description of various examples in the present disclosure are only intended to describe specific examples but not intended to make a limitation. Unless otherwise indicated clearly in the context, if a quantity of elements is not limited in particular, there may be one or a plurality of the elements. Besides, a term "and/or" used in the present disclosure covers any one or all possible combinations in listed items.

In making of a high definition map, information based on which point cloud data registration is performed includes global position and orientation information of a point cloud data collection device, the information is usually obtained by calculating based on global position and orientation information of an IMU unit in a mode of coordinate system transformation, the global position and orientation information of the IMU unit is obtained by combination solution based on data collected by a GNSS and the IMU, and the global position and orientation information includes position information and rotation information.

In a process of combination solution of the global position and orientation information, there may be a phenomenon of incapability of convergence in a solution process of a local part, and at the moment, a local rotation information deviation exists in the obtained global position and orientation information, namely a local rotation offset. The local rotation offset usually does not have an influence on trajectory smoothness, but may cause point cloud data to overlap in a corresponding position during registration, which affects a map making accuracy.

In the related art, more data may be obtained in the same position by increasing global measurement (for example, adding GNSS antennas), so faster convergence can be realized in the solution process. However, hardware cost of this scheme is high, and an application scenario is limited. In another scheme, the global position and orientation information with the local rotation offset may be replaced by data imputed by an odometer, but when a distance with a deviation is long, the scheme may cause a larger error.

Some embodiments of the present disclosure gives a global position and orientation correction method for point cloud registration, by obtaining to-be-corrected global position and orientation information of the first trajectory point, determining a plurality of pairs of second trajectory points based on the information, obtaining estimation information and measurement information of a relative position and orientation of each pair of second trajectory points respectively and solving the local rotation offset at the first trajectory point based on a transformation relation between the two types of information, the global position and orientation information can be corrected based on the local rotation offset, an overlapping phenomenon of point cloud registration is reduced, and accuracy of the made high definition map is improved.

The embodiments of the present disclosure will be described in detail below with reference to the drawings.

FIG. 1 shows a schematic diagram of an example system 100 where various methods and apparatuses described herein can be implemented according to some embodiments of the disclosure. Referring to FIG. 1, the system 100 includes a motor vehicle 110, a server 120 and one or more communication networks 130 coupling the motor vehicle 110 to the server 120.

In the embodiment of the present disclosure, the motor vehicle 110 may include a computing device according to the embodiment of the present disclosure and/or be configured to execute the method according to the embodiment of the present disclosure.

The server 120 may run one or more services or software applications used for the global position and orientation correction method for point cloud registration. In some embodiments, the server 120 may also provide other services or software applications which may include a nonvirtual environment and a virtual environment. In a configuration shown in FIG. 1, the server 120 may include one or more components which implement functions executed by the server 120. These components may include a software component, a hardware component or their combination capable of being executed by one or more processors. A user of the motor vehicle 110 may sequentially use one or more client application programs to interact with the server 120 to use services provided by these components. It should be understood that various system configurations are possible and may be different from the system 100. Therefore, FIG. 1 is an example of a system used for implementing various methods described herein and is not intended to make a limitation.

The server 120 may include one or more general-purpose computers, special-purpose server computers (for example, a personal computer (PC) server, a UNIX server and a mid-range server), a blade server, a mainframe computer, a server cluster or any of other appropriate layouts and/or combinations. The server 120 may include one or more virtual machines which run a virtual operating system, or involve other virtualized computing architectures (for example, one or more flexible pools of a logical storage device of a virtual storage device capable of being virtualized to maintain the server). In various embodiments, the server 120 may run one or more services or software applications providing functions described below.

A computing unit in the server 120 may run one or more operating systems including any of above operating systems and any of commercially applicable server operating systems. The server 120 may also run any one of various additional server application programs and/or middle-layer application programs, including an HTTP server, an FTP server, a CGI server, a JAVA server, a database server, etc.

In some implementations, the server 120 may include one or more application programs to analyze and merge data feed and/or incident updating received from the motor vehicle 110. The server 120 may also include one or more application programs to display data feed and/or real-time incidents via one or more display devices of the motor vehicle 110.

The network 130 may be any type of network known to those skilled in the art and may use any one type of various available protocols (including but not limited to TCP/IP, SNA, IPX and the like) to support data communication. Merely as an example, one or more networks 130 may be a satellite communication network, a local area network (LAN), an Ethernet-based network, a Token-Ring, a wide area network (WAN), the Internet, a virtual network, a virtual private network (VPN), an intranet, an extranet, a block chain network, a public switched telephone network (PSTN), an Infrared network, a wireless network (including, for example, Bluetooth, WiFi) and/or any combination of these networks and other networks.

The system 100 may also include one or more databases 150. In some embodiments, these databases may be used for storing data and other information. For example, one or more databases 150 may be used for storing information such as audio files and video files. The databases 150 may reside in various positions. For example, the database used by the server 120 may be in the local of the server 120, or may be away from the server 120 and can communicate with the server 120 via a network or a special-purpose connection. The database 150 may be various types. In some embodiments, the database used by the server 120 may be a database, for example, a relational database. One or a plurality of these databases may store, update and retrieve data to and from the database in response to a command.

In some embodiments, one or more databases 150 may be also used by an application program to store data of the application program. The database used by the application program may be databases of different types, for example, a key-value storage base, an object storage base or a conventional storage base supported by a file system.

The motor vehicle 110 may include a sensor 111 configured to sense the surroundings. The sensor 111 may include one or a plurality of the following sensors: a visual camera, an infrared camera, an ultrasonic sensor, a millimeter-wave radar and a laser radar (LiDAR). Different sensors may provide different detection accuracy and ranges. The camera may be mounted in the front, in the back or in other positions of the vehicle. The visual camera may capture conditions inside or outside the vehicle in real time and present the conditions to a driver and/or passengers. Besides, by analyzing a picture captured by the visual camera, information such as traffic light indication, crossroad conditions and other vehicle running states. The infrared camera may capture an object under the condition of night vision. The ultrasonic sensor may be mounted around the vehicle and is configured to measure a distance between an object outside the vehicle and the vehicle by adopting characteristics of ultrasonic waves such as high directivity. The millimeter-wave radar may be mounted in the front, in the back or in other positions of the vehicle and is configured to measure a distance between an object outside the vehicle and the vehicle by adopting characteristics of electromagnetic waves. The laser radar may be mounted in the front, in the back or in other positions of the vehicle and is configured to detect edge and shape information of an object to perform object recognition and tracking. Due to a Doppler effect, a radar apparatus may also measure speed change between the vehicle and a moving object.

The motor vehicle 110 may also include a communication apparatus 112. The communication apparatus 112 may include a satellite positioning module capable of receiving satellite positioning signals (for example, BeiDou, CPS, GLONASS and GALILEO) from a satellite 141 and generating coordinates based on these signals. The communication apparatus 112 may also include a module which performs communication with a mobile communication base station 142, and a mobile communication network may implement any suitable communication technology, for example, wireless communication technologies (for example, a 50 technology) existing at present or developing increasingly such as GSM/GPRS, CDMA and LTE. The communication apparatus 112 may also have an Internet of Vehicles or Vehicle-to-Everything (V2X) module and is configured to implement communication of vehicles with the outside, for example, Vehicle-to-Vehicle (V2V) communication with other vehicles 143 and Vehicle-to-Infrastructure (V2I) communication with infrastructure 144. Besides, the communication apparatus 112 may also have a module which is configured to communicate with a user terminal 145 (including but not limited to a smartphone, a tablet computer or a wearable apparatus such as a watch) by using a wireless local area network or Bluetooth with an IEEE802.11 standard, for example. By using the communication apparatus 112, the motor vehicle 110 may also be connected into the server 120 via the network 130.

The motor vehicle 110 may also include a control apparatus 113. The control apparatus 113 may include a processor communicating with various types of computer-readable storage apparatuses or media, for example, a central processing unit (CPU) or a graphics processing unit (GPU) or other special-purpose processors and the like. The control apparatus 113 may include an automatic driving system configured to automatically control various actuators in the vehicle. The automatic driving system is configured to control a power assembly, a steering assembly, a braking system and the like of the motor vehicle 110 (not shown) via the plurality of actuators to respond to the control from the plurality of sensors 111 or other input device to control acceleration, steering and braking respectively without manual intervention or limited manual intervention. A part of processing functions of the control apparatus 113 may be implemented through cloud computing. For example, some processing may be executed by using an on-board processor; and in the meantime, some other processing may be executed by using a computing resource on a cloud side. The control apparatus 113 may be configured to execute the method according to the present disclosure. Besides, the control apparatus 113 may be implemented as an example of a computing device of a motor vehicle side (client) according to the present disclosure.

The system 100 in FIG. 1 may be configured and operated in various modes to be capable of applying various methods and apparatuses described according to the present disclosure.

According to the embodiment of the present disclosure, as shown in FIG. 2, a global position and orientation correction method for point cloud registration is provided and includes: step S201, global position and orientation information of a first trajectory point is obtained; step S202, at least one pair of second trajectory points is determined based on the global position and orientation information, wherein the at least one pair of second trajectory points and the first trajectory point are located on the same trajectory; step S203, relative position and orientation estimation information and relative position and orientation measurement information of each pair of second trajectory points in the at least one pair of second trajectory points are obtained, wherein the relative position and orientation estimation information is obtained based on global position and orientation information of each second trajectory point in the pair of second trajectory points, and the relative position and orientation measurement information is obtained through a mileage measurement device; and step S204, a local rotation offset at the first trajectory point is calculated based on the relative position and orientation estimation information and the relative position and orientation measurement information of each pair of second trajectory points in the at least one pair of second trajectory points to correct the global position and orientation information.

By obtaining to-be-corrected global position and orientation information of the first trajectory point, determining a plurality of pairs of second trajectory points based on the information, obtaining estimation information and measurement information of a relative position and orientation of each pair of second trajectory points respectively and solving the local rotation offset at the first trajectory point based on a transformation relation between the two types of information, the global position and orientation information can be corrected based on the local rotation offset, an overlapping phenomenon of point cloud registration is reduced, and accuracy of the made high definition map is improved.

In some embodiments, while combination solution is performed based on data collected by a GNSS and an IMU, in some trajectory points, there may be a situation of incapability of convergence in a solution process of a local pant, so the global position and orientation information in the trajectory point has a local rotation offset, and the above trajectory point is the first trajectory point.

In some embodiments, while the first trajectory point is determined, global position and orientation information of the first trajectory point obtained by combination solution based on the GNSS and the IMU may be obtained, wherein the global position and orientation information includes global position information and rotation angle information of the first trajectory point.

In some embodiments, the at least one pair of second trajectory points may be determined based on the global position information in the global position and orientation information of the first trajectory point.

According to some embodiments, determining the at least one pair of second trajectory points based on the global position and orientation information may include: a first range is determined based on the position information in the global position and orientation information and a first distance threshold; and the at least one pair of second trajectory points is determined within the first range.

As for a segment of a trajectory, a local rotation offset corresponding to a trajectory point within a certain range is constant. Thus, a selection range (namely, the first range) of the second trajectory points is determined according to the to-be-corrected global position information of the first trajectory point, selection of the second trajectory points is performed within the range, and calculating accuracy of the local rotation offset can be further improved.

FIG. 3 shows a schematic diagram of a trajectory of a data collection device according to an example embodiment of the present disclosure. The data collection device may be, for example, the IMU.

In some embodiments, as shown in FIG. 3, the trajectory 301 of the data collection device includes the first trajectory point 302, the first range 303 may be determined based on the first trajectory point 302 and the first distance threshold, and then selection of the second trajectory points may be performed on the trajectory 301 within the first range 303, for example, selecting the second trajectory point 304 and the second trajectory point 305.

In some embodiments, the first distance threshold may be, for example, 1-30 meters, and it can be understood that the first distance threshold may be set by related technical persons based on actual conditions and is not limited herein.

The relative position and orientation measurement information of each pair of second trajectory points may be obtained through measurement by a mileage measurement device (for example, a radar inertial odometer), but when a distance between the two trajectory points exceeds a certain range, a measurement accuracy will not be guaranteed.

According to some embodiments, a distance between two second trajectory points in each pair of second trajectory points in the at least one pair of second trajectory points may be smaller than or equal to a second distance threshold.

In some embodiments, as shown in FIG. 3, as for a pair of second trajectory points (namely, the second trajectory point 304 and the second trajectory point 305), the distance between the two second trajectory points needs to meet a condition of being smaller than or equal to the second distance threshold.

In some embodiments, the second distance threshold may be, for example, 1-30 meters, and it can be understood that the second distance threshold may be set by related technical persons based on actual conditions and is not limited herein.

By limiting the distance between the two second trajectory points, accuracy of the relative position and orientation measurement information of the pair of second trajectory points can be guaranteed, and accuracy of the local rotation offset is improved.

In some embodiments, the relative position and orientation measurement information of each pair of second trajectory points may be obtained through the mileage measurement device.

In some embodiments, as for the relative position and orientation estimation information of each pair of second trajectory points, the global position and orientation information of each second trajectory point in the pair of second trajectory points may be obtained in a mode of above combination solution, and then the relative position and orientation estimation information of the pair of second trajectory points is obtained based on the corresponding global position and orientation information based on the two second trajectory points.

According to some embodiments, as shown in FIG. 4, calculating the local rotation offset at the first trajectory point based on the relative position and orientation estimation information and the relative position and orientation measurement information of each pair of second trajectory points in the at least one pair of second trajectory points may include: step S401, a transformation relationship matrix between the relative position and orientation estimation information and the relative position and orientation measurement information of each pair of second trajectory points in the at least one pair of second trajectory points is determined, wherein the transformation relationship matrix includes the local rotation offset to be solved; step S402, an equation for solving the local rotation offset is established based on the relative position and orientation estimation information, the relative position and orientation measurement information and the transformation relationship matrix of each pair of second trajectory points in the at least one pair of second trajectory points; and step S403, the local rotation offset is calculated based on the equation.

The transformation relationship matrix is established based on the local rotation offset, and a relation between a relative position and orientation estimated value and a relative position and orientation measured value is established based on the matrix, so that the equation for solving the local rotation offset is obtained. In the above mode, the local rotation offset at a position can be accurately captured based on the relative position and orientation measured value.

In some embodiments, as shown in FIG. 3, a global position and orientation actual value of the second trajectory point 304 is set to be $$\substack{G \\ t_1} T,$$

a global position and orientation actual value at the second trajectory point 305 (namely, corrected global position and orientation information) is $$\substack{G \\ t_2} T,$$

and $t_1$ and $t_2$ are respectively corresponding moments when the data collection device passes through the second trajectory point 304 and the second trajectory point 305.

Correspondingly, global position and orientation information of the second trajectory point 304 and global position and orientation information of the second trajectory point 305 are recorded as $$\substack{G \\ t_1} \tilde{T}$$

and $$\substack{G \\ t_2} \tilde{T}$$

respectively.

The local rotation offset to be solved in the position (namely, in the first trajectory point) is recorded as $\Delta R$ (namely, the transformation relationship matrix), so the corrected global position and orientation information $$\substack{G \\ t_1} T$$

and $$\substack{G \\ t_2} T$$

of the second trajectory point 304 and the second trajectory point 305 and the global position and orientation information $$\substack{G \\ t_1} \tilde{T}$$

and $$\substack{G \\ t_2} \tilde{T}$$

of the second trajectory point 304 and the second trajectory point 305 have the following relation respectively:

$$\substack{G \\ t_1} \tilde{T} = \substack{G \\ t_1} T \begin{bmatrix} \Delta R & 0 \\ 0 & 1 \end{bmatrix}$$

$$\substack{G \\ t_2} \tilde{T} = \substack{G \\ t_2} T \begin{bmatrix} \Delta R & 0 \\ 0 & 1 \end{bmatrix}$$

Besides, the relative position and orientation estimation information $$\substack{t_1 \\ t_2} \tilde{T}$$

between the two second trajectory points may be obtained through the following formula:

$$\substack{t_1 \\ t_2} \tilde{T} = \substack{G \\ t_1} \tilde{T}^{-1} \substack{G \\ t_2} \tilde{T}$$

Similarly, the relative position and orientation measurement information $$\substack{r_1\\r_2}T$$

between the two second trajectory points and the corrected global position and orientation information $$\substack{G\\r_1}T$$

and $$\substack{G\\r_2}T$$

of the second trajectory points 304 and 305 have the following relation:

$$\substack{r_1\\r_2}T = \substack{G\\r_1}T^{-1}\substack{G\\r_2}T$$

The relative position and orientation estimation information $$\substack{r_1\\r_2}\hat{T}$$

and the relative position and orientation measurement information $$\substack{r_1\\r_2}T$$

between the above two second trajectory points have the following relation:

$$\substack{r_1\\r_2}\hat{T} = \begin{bmatrix} \Delta R^T & 0 \\ 0 & 1 \end{bmatrix} \substack{G\\r_1}T^{-1}\substack{G\\r_2}T \begin{bmatrix} \Delta R & 0 \\ 0 & 1 \end{bmatrix}$$
$$= \begin{bmatrix} \Delta R^T & 0 \\ 0 & 1 \end{bmatrix} \substack{r_1\\r_2}T \begin{bmatrix} \Delta R & 0 \\ 0 & 1 \end{bmatrix}$$

The equation for solving the local rotation offset shown in the above formula is obtained, so the local rotation offset may be solved based on the above formula and the relative position and orientation estimation information $$\substack{r_1\\r_2}\hat{T}$$

and the relative position and orientation measurement information $$\substack{r_1\\r_2}T.$$

According to some embodiments, the relative position and orientation estimation information may include a relative position estimated value vector, the relative position and orientation measurement information may include a relative position measured value vector, and the at least one pair of second trajectory points may include at least three pairs of second trajectory points. Besides, establishing the equation for solving the local rotation offset based on the relative position and orientation estimation information, the relative position and orientation measurement information and the transformation relationship matrix of each pair of second trajectory points in the at least one pair of second trajectory points may include: the equation is established based on the relative position estimated value vector, the relative position measured value vector and the transformation relationship matrix of each pair of second trajectory points in the at least one pair of second trajectory points.

Solution of the local rotation offset is performed through position information in the relative position and orientation information, so that operation can be further simplified, a calculation resource is saved, and a calculation efficiency is improved.

In some embodiments, the relative position and orientation estimation information $$\substack{r_1\\r_2}\hat{T}$$

and the relative position and orientation measurement information $$\substack{r_1\\r_2}T$$

include position information and rotation information respectively, so $$\substack{r_1\\r_2}\hat{T}$$

and $$\substack{r_1\\r_2}T$$

may be represented by the following formulas respectively:

$$\substack{r_1\\r_2}\hat{T} = \begin{bmatrix} \substack{r_1\\r_2}\hat{R} & \substack{r_1\\r_2}\hat{P} \\ 0 & 1 \end{bmatrix}$$

$$\substack{r_1\\r_2}T = \begin{bmatrix} \substack{r_1\\r_2}R & \substack{r_1\\r_2}P \\ 0 & 1 \end{bmatrix}$$

where $$\substack{r_1\\r_2}\hat{P}$$

is the relative position estimated value vector in the relative position and orientation estimation information $$^{t_1}_{t_2}T, ^{t_1}_{t_2}p$$

is the relative position measured value vector in the relative position and orientation measurement information $$^{t_1}_{t_2}T;$$

and $$^{t_1}_{t_2}\tilde{R}$$

is a relative rotation estimated value matrix in the relative position and orientation estimation information $$^{t_1}_{t_2}\tilde{T},$$

and $$^{t_1}_{t_2}R$$

is a relative rotation measured value matrix in the relative position and orientation measurement information $$^{t_1}_{t_2}T.$$

Further, based on the above equation, the following relation may be obtained:

$$\begin{bmatrix} ^{t_1}_{t_2}\tilde{R} & ^{t_1}_{t_2}\tilde{p} \\ 0 & 1 \end{bmatrix} = \begin{bmatrix} \Delta R^{T\,t_1}_{\ \ t_2}R\Delta R & \Delta R^{T\,t_1}_{\ \ t_2}p \\ 0 & 1 \end{bmatrix} \quad (1)$$

In some embodiments, solution of the local rotation offset may be performed merely through an equation relation of the position information part, so that the solution process is simplified.

In some embodiments, different n pairs of second trajectory points may be obtained respectively (n≥3), the relative position estimated value vector and the relative position measured value vector of each pair of second trajectory points are obtained respectively, a linear inhomogeneous equation is established respectively based on the above relation, and least square solution thereof is solved, so that the local rotation offset is obtained.

In some embodiments, the relative position estimated value vector $$^{t_1}_{t_2}\tilde{p}$$

and the relative position measured value vector $$^{t_1}_{t_2}p$$

may be respectively recorded as, for example:

$$^{t_1}_{t_2}\tilde{p} = \begin{bmatrix} ^{t_1}_{t_2}\tilde{x} \\ ^{t_1}_{t_2}\tilde{y} \\ ^{t_1}_{t_2}\tilde{z} \end{bmatrix}$$

$$^{t_1}_{t_2}p = \begin{bmatrix} ^{t_1}_{t_2}x \\ ^{t_1}_{t_2}y \\ ^{t_1}_{t_2}z \end{bmatrix}$$

$\Delta R^T$ (namely, an inverse of the transformation relationship matrix) may be recorded as:

$$\Delta R^T = \begin{bmatrix} a_{11} & a_{12} & a_{13} \\ a_{21} & a_{22} & a_{23} \\ a_{31} & a_{32} & a_{33} \end{bmatrix}$$

For further simplified calculation, the above matrix and vectors may be transformed, to obtain the following relation:

$$\begin{bmatrix} ^{t_1}_{t_2}x & ^{t_1}_{t_2}y & ^{t_1}_{t_2}z & 0 & 0 & 0 & 0 & 0 & 0 \\ 0 & 0 & 0 & ^{t_1}_{t_2}x & ^{t_1}_{t_2}y & ^{t_1}_{t_2}z & 0 & 0 & 0 \\ 0 & 0 & 0 & 0 & 0 & 0 & ^{t_1}_{t_2}x & ^{t_1}_{t_2}y & ^{t_1}_{t_2}z \end{bmatrix} \begin{bmatrix} a_{11} \\ a_{12} \\ a_{13} \\ a_{21} \\ a_{22} \\ a_{23} \\ a_{31} \\ a_{32} \\ a_{33} \end{bmatrix} = \begin{bmatrix} ^{t_1}_{t_2}\tilde{x} \\ ^{t_1}_{t_2}\tilde{y} \\ ^{t_1}_{t_2}\tilde{z} \end{bmatrix}$$

recorded as, $$A_1 \begin{bmatrix} a_{11} \\ a_{12} \\ a_{13} \\ a_{21} \\ a_{22} \\ a_{23} \\ a_{31} \\ a_{32} \\ a_{33} \end{bmatrix} = b_1$$

Then, by respectively stacking the relative position estimated value vector and the relative position measured value vector of each of pair of second trajectory points in n pairs of second trajectory points, the following formula is obtained:

$$A \begin{bmatrix} a_{11} \\ a_{12} \\ a_{13} \\ a_{21} \\ a_{22} \\ a_{23} \\ a_{31} \\ a_{32} \\ a_{33} \end{bmatrix} = b$$

-continued where $$A = \begin{bmatrix} A_1 \\ A_2 \\ A_3 \\ \dots \\ A_n \end{bmatrix}, b = \begin{bmatrix} b_1 \\ b_2 \\ b_3 \\ \dots \\ b_n \end{bmatrix}$$

By solving the least square solution of the above linear inhomogeneous equation, $\Delta R^T$ can be obtained.

In some embodiments, a strictly orthogonal matrix cannot be obtained in the above mode, so orthogonal transformation may be performed on $\Delta R^T$ through matrix QR decomposition or by using following formula, and then orthogonalized $\Delta R$ is obtained:

$$\Delta R \leftarrow (\Delta R \Delta R^T)^{-1/2} \Delta R$$

The local rotation offset $\Delta R$ in the first trajectory point can be obtained.

In some embodiments, the following correction may be performed on the global position and orientation information $$^{G}_{t_i}\hat{T}$$

in the first trajectory point based on the local rotation offset $\Delta R$, and thus the corrected global position and orientation information $$^{G}_{t_i}T$$

is obtained:

$$^{G}_{t_i}T = {}^{G}_{t_i}\hat{T}\begin{bmatrix} \Delta R^T & 0 \\ 0 & 1 \end{bmatrix}$$

where $t_i$ is a moment when the data collection device corresponding to each trajectory point within the first range passes.

According to some embodiments, the relative position and orientation estimation information may include a relative rotation estimated value matrix, the relative position and orientation measurement information may include a relative rotation measured value matrix, and moreover, establishing the equation for solving the local rotation offset based in the relative position and orientation estimation information, the relative position and orientation measurement information and the transformation relationship matrix of each pair of second trajectory points in the at least one pair of second trajectory points may include: the equation is established based on the relative rotation estimated value matrix, the relative rotation measured value matrix and the transformation relationship matrix of each pair of second trajectory points in the at least one pair of second trajectory points.

Calculation of the local rotation offset is performed through the rotation information part in the relative position and orientation information, so that operation can be further simplified, the calculation resource is saved, and the calculation efficiency is improved.

Through the above formula (1), an equation relation of the rotation information part can be obtained as follows:

$$^{t_1}_{t_2}\tilde{R} = \Delta R^T {}^{t_1}_{t_2}R\Delta R \qquad (2)$$

In some embodiments, different n pairs of second trajectory points may be obtained respectively ($n \geq 3$), the relative rotation estimated value matrix and the relative rotation measured value matrix of each pair of second trajectory points are obtained respectively, a linear inhomogeneous equation is established respectively based on the above relation, a least square solution thereof is solved, and thus the local rotation offset is obtained.

According to some embodiments, as shown in FIG. 5, establishing the equation based on the relative rotation estimated value matrix, the relative rotation measured value matrix and the transformation relationship matrix of each pair of second trajectory points in the at least one pair of second trajectory points may include: step S501, logarithmic mapping is performed on the relative rotation estimated value matrix and the relative rotation measured value matrix of each pair of second trajectory points in the at least one pair of second trajectory points to obtain a relative rotation estimated value vector and a relative rotation measured value vector of the pair of second trajectory points; step S502, logarithmic mapping is performed on the transformation relationship matrix to obtain a transformation relationship vector; and step S503, a first equation is established as the equation for solving the local rotation offset based on the relative rotation estimated value vector, the relative rotation measured value vector and the transformation relationship vector of each pair of second trajectory points in the at least one pair of second trajectory points.

Accordingly, by performing logarithmic mapping on a rotation matrix and an offset matrix (namely, the transformation relationship matrix), a corresponding rotation vector and a transformation relationship vector are obtained, so that operation is simplified, the calculation resource is saved, and the calculation efficiency is improved.

In some embodiments, for further simplifying operation, logarithmic mapping may be performed respectively on the relative rotation estimated value matrix, the relative rotation measured value matrix and the transformation relationship matrix firstly, and taking $$^{t_1}_{t_2}\tilde{R}$$

and $$^{t_1}_{t_2}R$$

as an example, logarithmic mapping is performed on two sides of the above formula (2) respectively:

$$\text{Log}(^{t_1}_{t_2}\tilde{R}) = \text{Log}(\Delta R^T {}^{t_1}_{t_2}R\Delta R) =$$

$$\text{Log}(^{t_1}_{t_2}R) + (J_r^{-1}(\text{Log}(^{t_1}_{t_2}R)) - J_t^{-1}(\text{Log}(^{t_1}_{t_2}R)))\text{Log}(\Delta R)$$

where the relative rotation estimated value vector is recorded as $$_{t_2}^{t_1}\hat{\gamma},$$

the relative rotation measured value vector is recorded as $$_{t_2}^{t_1}\gamma,$$

and the transformation relationship vector is recorded as $\delta$, so the above three vectors may be represented through the following formula respectively:

$$_{t_2}^{t_1}\hat{\gamma} = \mathrm{Log}\left(_{t_2}^{t_1}\hat{R}\right)$$

$$_{t_2}^{t_1}\gamma = \mathrm{Log}\left(_{t_2}^{t_1}R\right)$$

$$\delta = \mathrm{Log}(\Delta R)$$

so the above equation relation may be further represented as:

$$_{t_2}^{t_1}\hat{\gamma} = {}_{t_2}^{t_1}\gamma + \left(J_r^{-1}\left(_{t_2}^{t_1}\gamma\right) - J_l^{-1}\left(_{t_2}^{t_1}\gamma\right)\right)\delta$$

Further transformation is performed on the above formula, to obtain the following equation:

$$\left(J_r^{-1}\left(_{t_2}^{t_1}\gamma\right) - J_l^{-1}\left(_{t_2}^{t_1}\gamma\right)\right)\delta = {}_{t_2}^{t_1}\hat{\gamma} - {}_{t_2}^{t_1}\gamma \qquad (3)$$

where $$J_r^{-1}(\theta) = I + \frac{1}{2}[\theta]_x + \left(\frac{1}{\theta^2} - \frac{1+\cos\theta}{2\theta\sin\theta}\right)[\theta]_x^2$$

$$J_r^{-1}(\theta) = I - \frac{1}{2}[\theta]_x + \left(\frac{1}{\theta^2} - \frac{1+\cos\theta}{2\theta\sin\theta}\right)[\theta]_x^2$$

$\theta$ is a three-dimension vector, $[\theta]_x$ is used for solving an antisymmetric matrix of $\theta$, and $\theta$ is a scalar corresponding to the vector $\theta$.

According to the above equation, the transformation relationship vector in the first trajectory point may be obtained by solving through the relative rotation estimated value vector and the relative rotation measured value vector of one pair of second trajectory points, and then a corresponding transformation relationship matrix may be obtained in a mode of logarithmic mapping, a specific formula is as follows:

$$\Delta R = \mathrm{Exp} \qquad (8)$$

In some embodiments, the relative rotation estimated value vector and the relative rotation measured value vector of each pair of second trajectory points in a plurality of pairs of second trajectory points may also be obtained respectively, a linear inhomogeneous equation is established based on a constrained relation of the formula (3) and a stacking method similar to the above operation, a least square solution thereof is solved, and by solving based on the rotation information of the plurality of second trajectory points, the obtained transformation relationship matrix can be more accurate.

In some embodiments, the strictly orthogonal matrix cannot be obtained in the above mode, so orthogonal transformation may be further performed on $\Delta R$ through matrix QR decomposition or by using the following formula, and thus orthogonalized $\Delta R$ is obtained:

$$\Delta R \leftarrow \left(\Delta R \Delta R^T\right)^{-\frac{1}{2}} \Delta R$$

The local rotation offset $\Delta R$ in the first trajectory point can be obtained.

In some embodiments, the following correction may be performed on the global position and orientation information $$_{t_i}^{G}\hat{T}$$

in the first trajectory point based on the local rotation offset $\Delta R$, and thus the corrected global position and orientation information $$_{t_i}^{G}T$$

is obtained:

$$_{t_i}^{G}T = {}_{t_i}^{G}\hat{T}\begin{bmatrix} \Delta R^T & 0 \\ 0 & 1 \end{bmatrix}$$

where $t_i$ is a moment when the data collection device corresponding to each trajectory point within the first range passes.

According to some embodiments, as shown in FIG. 6, a global position and orientation correction apparatus 600 for point cloud registration is provided and includes: a first obtaining unit 610, configured to obtain global position and orientation information of a first trajectory point; a first determining unit 620, configured to determine at least one pair of second trajectory points based on the global position and orientation information, wherein the at least one pair of second trajectory points and the first trajectory point are located on the same trajectory; a second obtaining unit 630, configured to obtain relative position and orientation estimation information and relative position and orientation measurement information of each pair of second trajectory points in the at least one pair of second trajectory points, wherein the relative position and orientation estimation information is obtained based on global position and orientation information of each second trajectory point in the pair of second trajectory points, and the relative position and orientation measurement information is obtained through a mileage measurement device; and a calculating unit 640, configured to calculate a local rotation offset at the first trajectory point based on the relative position and orientation estimation information and the relative position and orientation measurement information of each pair of second trajectory points in the at least one pair of second trajectory points to correct the global position and orientation information.

Operations of the unit 610 to the unit 640 in the global position and orientation correction apparatus 600 for point cloud registration are similar to operations of step S201 to step S204 of the above global position and orientation correction method for point cloud registration, which is not repeated here.

According to some embodiments, the calculating unit may include: a first determining sub-unit, configured to determine a transformation relationship matrix between the relative position and orientation estimation information and the relative position and orientation measurement information of each pair of second trajectory points in the at least one pair of second trajectory points, wherein the transformation relationship matrix includes the local rotation offset to be solved; an establishing sub-unit, configured to establish an equation for solving the local rotation offset based on the relative position and orientation estimation information, the relative position and orientation measurement information and the transformation relationship matrix of each pair of second trajectory points in the at least one pair of second trajectory points; and a calculating sub-unit, configured to calculate the local rotation offset based on the equation.

According to some embodiments, the relative position and orientation estimation information may include a relative position estimated value vector, the relative position and orientation measurement information may include a relative position measured value vector, and the at least one pair of second trajectory points includes at least three pairs of second trajectory points, wherein the establishing sub-unit may be configured to: establish the equation based on the relative position estimated value vector, the relative position measured value vector and the transformation relationship matrix of the each pair of second trajectory points in the at least one pair of second trajectory points.

According to some embodiments, the relative position and orientation estimation information may include a relative rotation estimated value matrix, and the relative position and orientation measurement information may include a relative rotation measured value matrix, wherein the establishing sub-unit may be configured to: establish the equation based on the relative rotation estimated value matrix, the relative rotation measured value matrix and the transformation relationship matrix of each pair of second trajectory points in the at least one pair of second trajectory points.

According to some embodiments, the establishing sub-unit may be further configured to: perform logarithmic mapping on the relative rotation estimated value matrix and the relative rotation measured value matrix of each pair of second trajectory points in the at least one pair of second trajectory points to obtain a relative rotation estimated value vector and a relative rotation measured value vector of the pair of second trajectory points; perform logarithmic mapping on the transformation relationship matrix to obtain a transformation relationship vector: and establish a first equation as the equation for solving the local rotation offset based on the relative rotation estimated value vector, the relative rotation measured value vector and the transformation relationship vector of each pair of second trajectory points in the at least one pair of second trajectory points.

According to some embodiments, the first determining unit may include: a second determining sub-unit, configured to determine a first range based on position information in the global position and orientation information and a first distance threshold; and a third determining sub-unit, configured to determine the at least one pair of second trajectory points within the first range.

According to some embodiments, a distance between two second trajectory points in each pair of second trajectory points in the at least one pair of second trajectory points may be smaller than or equal to a second distance threshold.

According to some embodiments of the present disclosure, an electronic device, a readable storage medium and a computer program product are further provided.

Referring to FIG. 7, a structural block diagram of an electronic device 700 capable of serving as a server or a client of the present disclosure is described now, which is an example of a hardware device applicable to various aspects of the present disclosure. The electronic device intends to represent various digital electronic computer devices, such as a laptop computer, a desktop computer, a workbench, a personal digital assistant, a server, a blade server, a mainframe computer and other suitable computers. The electronic device may also represent various mobile apparatuses, such as a personal digital assistant, a cell phone, a smartphone, a wearable device and other similar computing apparatuses. Components shown herein, their connections and relations and their functions are only examples and do not intend to limit implementation of the present disclosure described and/or required herein.

As shown in FIG. 7, the electronic device 700 includes a computing unit 701, which may execute various appropriate actions and processing according to a computer program stored in a read-only memory (ROM) 702 or a computer program loaded from a storage unit 708 to a random access memory (RAM) 703. The RAM 703 can also store various programs and data needed by operations of the electronic device 700. The computing unit 701, the ROM 702 and the RAM 703 are mutually connected through a bus 704. An input/output (I/O) interface 705 is also connected to the bus (704).

A plurality of components in the electronic device 700 are connected to the I/O interface 705, including: an input unit 706, an output unit 707, the storage unit 708, and a communication unit 709. The input unit 706 may be any type of devices capable of inputting information to the electronic device 700 and can receive input number or character information and generate key signal input related to user setting and/or function control of the electronic device and can include but is not limited to a mouse, a keyboard, a touch screen, a trackpad, a trackball, a joystick, a microphone and/or a remote-control unit. The output unit 707 may be any type of device capable of displaying information and may include but is not limited to a display, a speaker, a video/audio output terminal, a vibrator and/or a printer. The storage unit 708 may include but is not limited to a magnetic disk and a compact disc. The communication unit 709 allows the electronic device 700 to exchange information/data with other devices through a computer network, such as Internet, and/or various telecommunication networks and may include but is not limited to a modem, a network card, an infrared communication device, a wireless communication transceiver and/or a chipset, for example, a Bluetooth™ device, a 802.11 device, a WiFi device, a WiMax device, a cellular communication device and/or similar items.

The computing unit 701 may be various general-purpose and/or special-purpose processing components with processing and computing capacity. Some examples of the computing unit 701 include but are not limited to a central processing unit (CPU), a graphics processing unit (GPU), various special-purpose artificial intelligence (AI) computing chips, various computing units for running a machine learning model algorithm, a digital signal processor (DSP), and any appropriate processor, controller, microcontroller and the like. The computing unit 701 executes each method and processing described above, for example, the above global position and orientation correction method for point cloud registration. For example, in some embodiments, the above global position and orientation correction method for point cloud registration may be realized as a computer software program, which is tangibly contained in a machine readable medium, for example, the storage unit 708. In some embodiments, a part of or all of the computer program may be loaded and/or installed onto the electronic device 700 via the ROM 702 and/or the communication unit 709. When the computer program is loaded to the RAM 703 and executed by the computing unit 701, one or more steps of the global position and orientation correction method for point cloud registration described above can be executed. Alternatively, in other embodiments, the computing unit 701 may be configured to execute the above global position and orientation correction method for point cloud registration in any other appropriate mode (for example, by means of firmware).

Various implementations of the systems and technologies described above in this paper may be implemented in a digital electronic circuit system, an integrated circuit system, a field programmable gate array (FPGA), an application specific integrated circuit (ASIC), an application specific standard part (ASSP), a system on chip (SOC), a complex programmable logic device (CPLD), computer hardware, firmware, software and/or their combinations. These various implementations may include: being implemented in one or more computer programs, wherein the one or more computer programs may be executed and/or interpreted on a programmable system including at least one programmable processor, and the programmable processor may be a special-purpose or general-purpose programmable processor, and may receive data and instructions from a storage system, at least one input apparatus, and at least one output apparatus, and transmit the data and the instructions to the storage system, the at least one input apparatus, and the at least one output apparatus.

Program codes for implementing the methods of the present disclosure may be written in any combination of one or more programming languages. These program codes may be provided to processors or controllers of a general-purpose computer, a special-purpose computer or other programmable data processing apparatuses, so that when executed by the processors or controllers, the program codes enable the functions/operations specified in the flow diagrams and/or block diagrams to be implemented. The program codes may be executed completely on a machine, partially on the machine, partially on the machine and partially on a remote machine as a separate software package, or completely on the remote machine or server.

In the context of the present disclosure, a machine readable medium may be a tangible medium that may contain or store a program for use by or in connection with an instruction execution system, apparatus or device. The machine readable medium may be a machine readable signal medium or a machine readable storage medium. The machine readable medium may include but not limited to an electronic, magnetic, optical, electromagnetic, infrared, or semiconductor system, apparatus or device, or any suitable combination of the above contents. More specific examples of the machine readable storage medium will include electrical connections based on one or more lines, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above contents.

In order to provide interactions with users, the systems and techniques described herein may be implemented on a computer, and the computer has: a display apparatus for displaying information to the users (e.g., a CRT (cathode ray tube) or LCD (liquid crystal display) monitor); and a keyboard and a pointing apparatuses (e.g., a mouse or trackball), through which the users may provide input to the computer. Other types of apparatuses may further be used to provide interactions with users; for example, feedback provided to the users may be any form of sensory feedback (e.g., visual feedback, auditory feedback, or tactile feedback); an input from the users may be received in any form (including acoustic input, voice input or tactile input).

The systems and techniques described herein may be implemented in a computing system including background components (e.g., as a data server), or a computing system including middleware components (e.g., an application server) or a computing system including front-end components (e.g., a user computer with a graphical user interface or a web browser through which a user may interact with the implementations of the systems and technologies described herein), or a computing system including any combination of such background components, middleware components, or front-end components. The components of the system may be interconnected by digital data communication (e.g., a communication network) in any form or medium. Examples of the communication network include: a local area network (LAN), a wide area network (WAN) and the Internet.

A computer system may include a client and a server. The client and the server are generally away from each other and usually interact through a communication network. A relation between the client and the server is generated by running a computer program with a mutual client-server relation on a corresponding computer. The server may be a cloud server, or may also be a server of a distributed system, or a server combined with a block chain.

It should be understood that steps can be reranked, added or deleted by using various forms of flows shown above. For example, all the steps recorded in the present disclosure can be executed in parallel, or in sequence or in different orders, which is not limited herein as long as a desired result of the technical schemes disclosed by the present disclosure can be realized.

Though the embodiments or the examples of the present disclosure are already described with reference to the accompanying drawings, it should be understood that the above method, system or device is only an embodiment or example, and the scope of the present disclosure is not limited by these embodiments or examples but limited only by the scope of the authorized claims and their equivalents. Various elements in the embodiments or the examples may be omitted or replaced by their equivalent elements. Besides, all the steps may be executed in a sequence different from a sequence described in the present disclosure. Furthermore, various elements in the embodiments or the examples may be combined in various modes. What counts is that with technology evolution, many elements described here can be replaced by equivalent elements appearing after the present disclosure.

The invention claimed is:

1. A computer-implemented method, comprising:
   obtaining global position and orientation information of a first trajectory point, wherein the global position and orientation information of the first trajectory point is obtained by combination solution based on data collected by a global navigation satellites system (GNSS) and an inertial measurement unit (IMU), and wherein a local rotation offset exists in the global position and orientation information of the first trajectory point based on a situation of incapability of convergence in a solution process of a local part in the combination solution;

determining at least one pair of second trajectory points based on the global position and orientation information of the first trajectory point, wherein the at least one pair of the second trajectory points and the first trajectory point are located on a trajectory;

obtaining relative position and orientation estimation information and relative position and orientation measurement information of each pair of the second trajectory points in the at least one pair of the second trajectory points, wherein the relative position and orientation estimation information is obtained by performing matrix multiplication between an inverse of global position and orientation information of one second trajectory point and global position and orientation information of another second trajectory point in the pair of the second trajectory points, and is used to represent a relative positional relationship and a relative orientation relationship between one second trajectory point and another second trajectory point in the pair of the second trajectory points, wherein the global position and orientation information of each second trajectory point in the pair of the second trajectory points is obtained by combination solution based on data collected by the GNSS and the IMU, and wherein the relative position and orientation measurement information is used to represent a measured value of the relative positional relationship and the relative orientation relationship between one second trajectory point and another second trajectory point in the pair of the second trajectory points and is obtained through a mileage measurement device;

calculating the local rotation offset at the first trajectory point based on the relative position and orientation estimation information and the relative position and orientation measurement information of each pair of the second trajectory points in the at least one pair of the second trajectory points to correct the global position and orientation information of the first trajectory point, wherein the calculating the local rotation offset at the first trajectory point comprises:

determining a transformation relationship matrix between the relative position and orientation estimation information and the relative position and orientation measurement information of each pair of the second trajectory points in the at least one pair of the second trajectory points, wherein the transformation relationship matrix comprises the local rotation offset to be solved;

establishing an equation for solving the local rotation offset based on the relative position and orientation estimation information, the relative position and orientation measurement information and the transformation relationship matrix of each pair of the second trajectory points in the at least one pair of the second trajectory points, wherein the equation is established on an equivalence relationship that the local rotation offset to be solved at the first trajectory point is the same as a local rotation offset at each second trajectory point in the at least one pair of the second trajectory points;

calculating the local rotation offset based on the equation; and correcting the global position and orientation information of the first trajectory point based on the local rotation offset calculated;

determining, based on corrected global position and orientation information of the first trajectory point, global position and orientation information of a point cloud data collection device at the first trajectory point;

determining, based on the global position and orientation information of the point cloud data collection device, a registration position of point cloud data obtained by the point cloud data collection device at the first trajectory point relative to an existing point cloud registration result, to update the existing point cloud registration result;

generating a high definition map based on an updated existing point cloud registration result; and transmitting the high definition map to a self-driving automobile for automatic driving.

2. The method according to claim 1, wherein:

the relative position and orientation estimation information comprises a relative position estimated value vector, the relative position and orientation measurement information comprises a relative position measured value vector, the at least one pair of the second trajectory points comprises at least three pairs of the second trajectory points, and wherein the establishing the equation for solving the local rotation offset based on the relative position and orientation estimation information, the relative position and orientation measurement information and the transformation relationship matrix of each pair of the second trajectory points in the at least one pair of the second trajectory points comprises:

establishing the equation based on the relative position estimated value vector, the relative position measured value vector, and the transformation relationship matrix of each pair of the second trajectory points in the at least one pair of the second trajectory points.

3. The method according to claim 1, wherein:

the relative position and orientation estimation information comprises a relative rotation estimated value matrix, the relative position and orientation measurement information comprises a relative rotation measured value matrix, and wherein the establishing the equation for solving the local rotation offset based on the relative position and orientation estimation information, the relative position and orientation measurement information, and the transformation relationship matrix of each pair of the second trajectory points in the at least one pair of the second trajectory points comprises:

establishing the equation based on the relative rotation estimated value matrix, the relative rotation measured value matrix, and the transformation relationship matrix of each pair of the second trajectory points in the at least one pair of the second trajectory points.

4. The method according to claim 3, wherein the establishing the equation based on the relative rotation estimated value matrix, the relative rotation measured value matrix, and the transformation relationship matrix of each pair of the second trajectory points in the at least one pair of the second trajectory points comprises:

performing logarithmic mapping on the relative rotation estimated value matrix and the relative rotation measured value matrix of each pair of the second trajectory points in the at least one pair of the second trajectory points to obtain a relative rotation estimated value vector and a relative rotation measured value vector of the pair of the second trajectory points;

performing logarithmic mapping on the transformation relationship matrix to obtain a transformation relationship vector; and establishing a first equation as the equation for solving the local rotation offset based on the relative rotation estimated value vector, the relative rotation measured value vector, and the transformation relationship vector of each pair of the second trajectory points in the at least one pair of the second trajectory points.

5. The method according to claim 1, wherein the determining the at least one pair of second trajectory points based on the global position and orientation information comprises:

determining a first range based on position information in the global position and orientation information and a first distance threshold, wherein the first distance threshold is preset and used to determine the first range surrounding the first trajectory point within which a local rotation offset corresponding to a trajectory point is constant; and determining the at least one pair of the second trajectory points within the first range.

6. The method according to claim 1, wherein a distance between two second trajectory points in each pair of the second trajectory points in the at least one pair of the second trajectory points is smaller than or equal to a second distance threshold.

7. An electronic device, comprising:

one or more processors; and a memory storing one or more programs configured to be executed by the one or more processors, the one or more programs comprising instructions for:

obtaining global position and orientation information of a first trajectory point, wherein the global position and orientation information of the first trajectory point is obtained by combination solution based on data collected by a global navigation satellites system (GNSS) and an inertial measurement unit (IMU), and wherein a local rotation offset exists in the global position and orientation information of the first trajectory point based on a situation of incapability of convergence in a solution process of a local part in the combination solution;

determining at least one pair of second trajectory points based on the global position and orientation information of the first trajectory point, wherein the at least one pair of the second trajectory points and the first trajectory point are located on a trajectory;

obtaining relative position and orientation estimation information and relative position and orientation measurement information of each pair of the second trajectory points in the at least one pair of the second trajectory points, wherein the relative position and orientation estimation information is obtained by performing matrix multiplication between an inverse of global position and orientation information of one second trajectory point and global position and orientation information of another second trajectory point in the pair of the second trajectory points, and is used to represent a relative positional relationship and a relative orientation relationship between one second trajectory point and another second trajectory point in the pair of the second trajectory points, wherein the global position and orientation information of each second trajectory point in the pair of the second trajectory points is obtained by combination solution based on data collected by the GNSS and the IMU, and wherein the relative position and orientation measurement information is used to represent a measured value of the relative positional relationship and the relative orientation relationship between one second trajectory point and another second trajectory point in the pair of the second trajectory points and is obtained through a mileage measurement device;

calculating the local rotation offset at the first trajectory point based on the relative position and orientation estimation information and the relative position and orientation measurement information of each pair of the second trajectory points in the at least one pair of the second trajectory points to correct the global position and orientation information of the first trajectory point, wherein the calculating the local rotation offset at the first trajectory point comprise:

determining a transformation relationship matrix between the relative position and orientation estimation information and the relative position and orientation measurement information of each pair of the second trajectory points in the at least one pair of the second trajectory points, wherein the transformation relationship matrix comprises the local rotation offset to be solved;

establishing an equation for solving the local rotation offset based on the relative position and orientation estimation information, the relative position and orientation measurement information and the transformation relationship matrix of each pair of the second trajectory points in the at least one pair of the second trajectory points, wherein the equation is established on an equivalence relationship that the local rotation offset to be solved at the first trajectory point is the same as a local rotation offset at each second trajectory point in the at least one pair of the second trajectory points;

calculating the local rotation offset based on the equation; and correcting the global position and orientation information of the first trajectory point based on the local rotation offset calculated;

determining, based on corrected global position and orientation information of the first trajectory point, global position and orientation information of a point cloud data collection device at the first trajectory point;

determining, based on the global position and orientation information of the point cloud data collection device, a registration position of point cloud data obtained by the point cloud data collection device at the first trajectory point relative to an existing point cloud registration result, to update the existing point cloud registration result;

generating a high definition map based on an updated existing point cloud registration result; and transmitting the high definition map to a self-driving automobile for automatic driving.

8. The electronic device according to claim 7, wherein:

the relative position and orientation estimation information comprises a relative position estimated value vector, 27
28 the relative position and orientation measurement information comprises a relative position measured value vector, the at least one pair of the second trajectory points comprises at least three pairs of the second trajectory points, and wherein the establishing the equation for solving the local rotation offset based on the relative position and orientation estimation information, the relative position and orientation measurement information and the transformation relationship matrix of each pair of the second trajectory points in the at least one pair of the second trajectory points comprises:

establishing the equation based on the relative position estimated value vector, the relative position measured value vector, and the transformation relationship matrix of each pair of the second trajectory points in the at least one pair of the second trajectory points.

9. The electronic device according to claim 7, wherein:

the relative position and orientation estimation information comprises a relative rotation estimated value matrix, the relative position and orientation measurement information comprises a relative rotation measured value matrix, and wherein the establishing the equation for solving the local rotation offset based on the relative position and orientation estimation information, the relative position and orientation measurement information, and the transformation relationship matrix of each pair of the second trajectory points in the at least one pair of the second trajectory points comprises:

establishing the equation based on the relative rotation estimated value matrix, the relative rotation measured value matrix, and the transformation relationship matrix of each pair of the second trajectory points in the at least one pair of the second trajectory points.

10. The electronic device according to claim 9, wherein the establishing the equation based on the relative rotation estimated value matrix, the relative rotation measured value matrix and the transformation relationship matrix of each pair of the second trajectory points in the at least one pair of the second trajectory points comprises:

performing logarithmic mapping on the relative rotation estimated value matrix and the relative rotation measured value matrix of each pair of the second trajectory points in the at least one pair of the second trajectory points to obtain a relative rotation estimated value vector, and a relative rotation measured value vector of the pair of the second trajectory points;

performing logarithmic mapping on the transformation relationship matrix to obtain a transformation relationship vector; and establishing a first equation as the equation for solving the local rotation offset based on the relative rotation estimated value vector, the relative rotation measured value vector, and the transformation relationship vector of each pair of the second trajectory points in the at least one pair of the second trajectory points.

11. The electronic device according to claim 7, wherein the determining the at least one pair of second trajectory points based on the global position and orientation information comprises:

determining a first range based on position information in the global position and orientation information and a first distance threshold, wherein the first distance threshold is preset and used to determine the first range surrounding the first trajectory point within which a local rotation offset corresponding to a trajectory point is constant; and determining the at least one pair of the second trajectory points within the first range.

12. The electronic device according to claim 7, wherein a distance between two second trajectory points in each pair of the second trajectory points in the at least one pair of the second trajectory points is smaller than or equal to a second distance threshold.

13. A non-transitory computer-readable storage medium, storing one or more programs comprising instructions that, when executed by one or more processors of a computing device, cause the computing device to perform operations comprising:

obtaining global position and orientation information of a first trajectory point, wherein the global position and orientation information of the first trajectory point is obtained by combination solution based on data collected by a global navigation satellites system (GNSS) and an inertial measurement unit (IMU), and wherein a local rotation offset exists in the global position and orientation information of the first trajectory point based on a situation of incapability of convergence in a solution process of a local part in the combination solution;

determining at least one pair of second trajectory points based on the global position and orientation information of the first trajectory point, wherein the at least one pair of the second trajectory points and the first trajectory point are located on a trajectory;

obtaining relative position and orientation estimation information and relative position and orientation measurement information of each pair of the second trajectory points in the at least one pair of the second trajectory points, wherein the relative position and orientation estimation information is obtained by performing matrix multiplication between an inverse of global position and orientation information of one second trajectory point and global position and orientation information of another second trajectory point in the pair of the second trajectory points, and is used to represent a relative positional relationship and a relative orientation relationship between one second trajectory point and another second trajectory point in the pair of the second trajectory points, wherein the global position and orientation information of each second trajectory point in the pair of the second trajectory points is obtained by combination solution based on data collected by the GNSS and the IMU, and wherein the relative position and orientation measurement information is used to represent a measured value of the relative positional relationship and the relative orientation relationship between one second trajectory point and another second trajectory point in the pair of the second trajectory points and is obtained through a mileage measurement device;

calculating the local rotation offset at the first trajectory point based on the relative position and orientation estimation information and the relative position and orientation measurement information of each pair of the second trajectory points in the at least one pair of the second trajectory points to correct the global position and orientation information of the first trajectory point, wherein the calculating the local rotation offset at the first trajectory point comprise:

determining a transformation relationship matrix between the relative position and orientation estimation information and the relative position and orientation measurement information of each pair of the second trajectory points in the at least one pair of the second trajectory points, wherein the transformation relationship matrix comprises the local rotation offset to be solved;

establishing an equation for solving the local rotation offset based on the relative position and orientation estimation information, the relative position and orientation measurement information and the transformation relationship matrix of each pair of the second trajectory points in the at least one pair of the second trajectory points, wherein the equation is established on an equivalence relationship that the local rotation offset to be solved at the first trajectory point is the same as a local rotation offset at each second trajectory point in the at least one pair of the second trajectory points;

calculating the local rotation offset based on the equation; and correcting the global position and orientation information of the first trajectory point based on the local rotation offset calculated;

determining, based on corrected global position and orientation information of the first trajectory point, global position and orientation information of a point cloud data collection device at the first trajectory point;

determining, based on the global position and orientation information of the point cloud data collection device, a registration position of point cloud data obtained by the point cloud data collection device at the first trajectory point relative to an existing point cloud registration result, to update the existing point cloud registration result;

generating a high definition map based on an updated existing point cloud registration result; and transmitting the high definition map to a self-driving automobile for automatic driving.

14. The non-transitory computer-readable storage medium according to claim 13, wherein:

The relative position and orientation estimation information comprises a relative position estimated value vector, the relative position and orientation measurement information comprises a relative position measured value vector, the at least one pair of the second trajectory points comprises at least three pairs of the second trajectory points, and wherein the establishing the equation for solving the local rotation offset based on the relative position and orientation estimation information, the relative position and orientation measurement information and the transformation relationship matrix of each pair of the second trajectory points in the at least one pair of the second trajectory points comprises:

establishing the equation based on the relative position estimated value vector, the relative position measured value vector and the transformation relationship matrix of each pair of the second trajectory points in the at least one pair of the second trajectory points.

15. The non-transitory computer-readable storage medium according to claim 13, wherein:

the relative position and orientation estimation information comprises a relative rotation estimated value matrix, the relative position and orientation measurement information comprises a relative rotation measured value matrix, and wherein the establishing the equation for solving the local rotation offset based on the relative position and orientation estimation information, the relative position and orientation measurement information, and the transformation relationship matrix of each pair of the second trajectory points in the at least one pair of the second trajectory points comprises:

establishing the equation based on the relative rotation estimated value matrix, the relative rotation measured value matrix, and the transformation relationship matrix of each pair of the second trajectory points in the at least one pair of the second trajectory points.

16. The non-transitory computer-readable storage medium according to claim 15, wherein the establishing the equation based on the relative rotation estimated value matrix, the relative rotation measured value matrix and the transformation relationship matrix of each pair of the second trajectory points in the at least one pair of the second trajectory points comprises:

performing logarithmic mapping on the relative rotation estimated value matrix and the relative rotation measured value matrix of each pair of the second trajectory points in the at least one pair of the second trajectory points to obtain a relative rotation estimated value vector and a relative rotation measured value vector of the pair of the second trajectory points;

performing logarithmic mapping on the transformation relationship matrix to obtain a transformation relationship vector; and establishing a first equation as the equation for solving the local rotation offset based on the relative rotation estimated value vector, the relative rotation measured value vector and the transformation relationship vector of each pair of the second trajectory points in the at least one pair of the second trajectory points.

17. The non-transitory computer-readable storage medium according to claim 13, wherein the determining the at least one pair of second trajectory points based on the global position and orientation information comprises:

determining a first range based on position information in the global position and orientation information and a first distance threshold, wherein the first distance threshold is preset and used to determine the first range surrounding the first trajectory point within which a local rotation offset corresponding to a trajectory point is constant; and determining the at least one pair of the second trajectory points within the first range.

*    *    *    *    *